Oct. 7, 1947.        E. W. KAMMER        2,428,369
OPTICAL TIME BASE GENERATOR
Filed Dec. 14, 1945        2 Sheets-Sheet 2
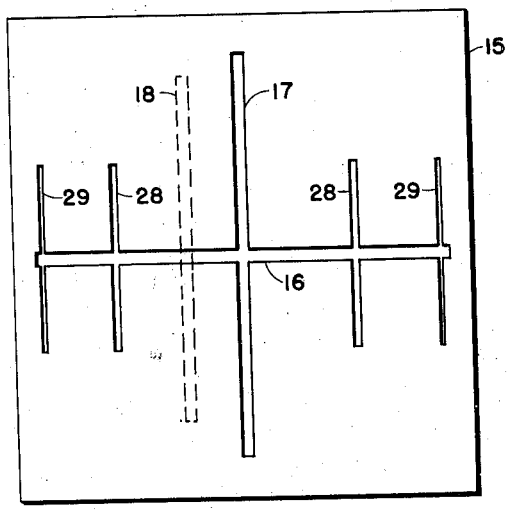
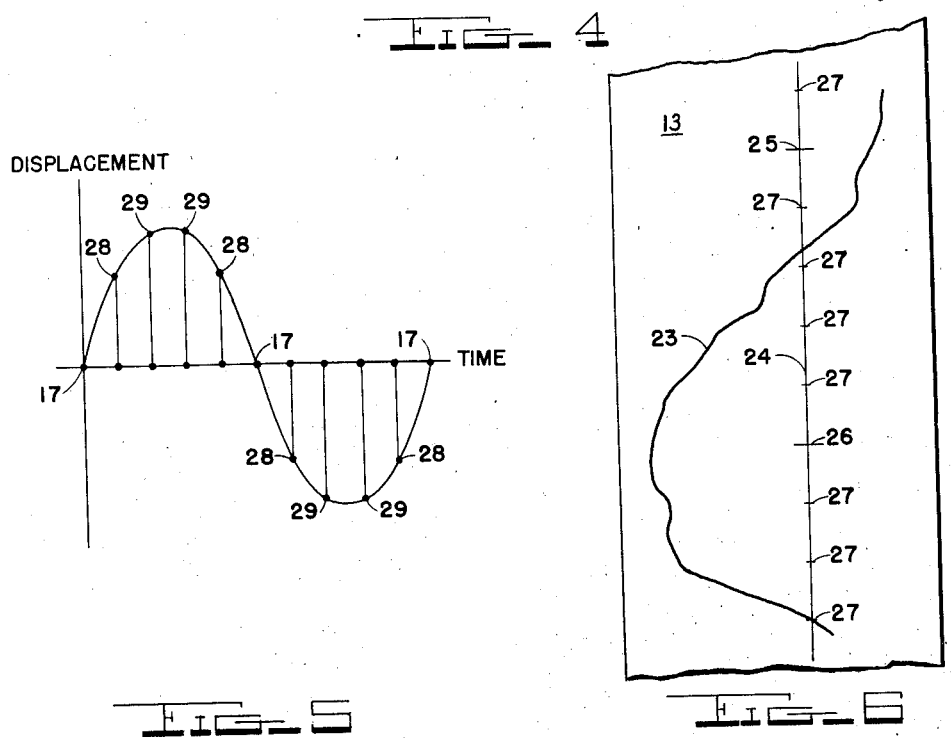
ERWIN W. KAMMER Patented Oct. 7, 1947

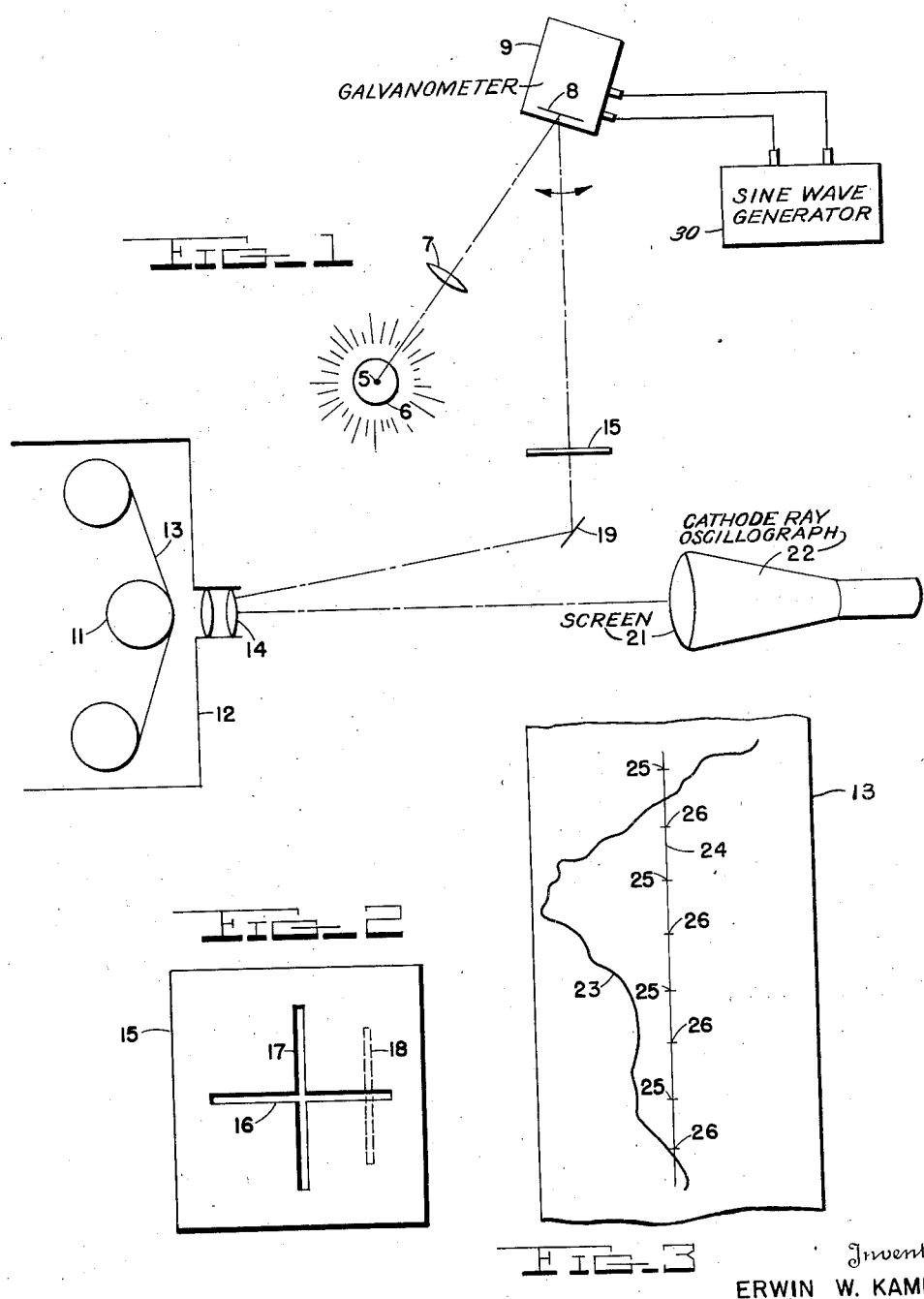

2,428,369

UNITED STATES PATENT OFFICE 2,428,369

OPTICAL TIME BASE GENERATOR

Erwin W. Kammer, Fairlington, Va.

Application December 14, 1945, Serial No. 635,124

5 Claims. (Cl. 234—61)

(Granted under the act of March 3, 1883, as amended April 30, 1928; 370 O. G. 757)

This invention relates to optical time base generators and, more particularly, to such a generator adapted especially for producing a time base on a moving film photographic record of transitory phenomena.

One object of the invention is to provide a system and means for providing a time base on photographic records of the above class in which time interval marks will be recorded indicating the lapse of equal periods of time.

Another object of the invention is to provide time interval marks of the aforementioned type which recur at a frequency of several thousand times per second.

Still another object of the invention is to provide such time interval marks which will be sharply defined and permit a high degree of accuracy in reading elapsed time.

A further object of the invention is to provide a time base that will be positionable on the photographic recording element in close proximity to the photographic record of the transitory phenomenon being recorded, and that will permit more than one such phenomenon to be recorded in successive exposures of the recording element.

A still further object of the invention is to provide a line running transverse to the time interval marks which may be employed as a reference line for measuring the instantaneous amplitude of displacement of the phenomenon observed.

It is also another object of the invention to provide such a reference line which maintains a constant relation on the photographic recording element to the zero amplitude position of the phenomenon observed, rather than a constant relation to the camera mechanism, so that a lateral shifting of the moving film within the camera will not reduce the accuracy of said reference line.

In accordance with this invention, light from a straight wire filament lamp is focussed by a lens upon the movable mirror of a galvanometer and, by applying a periodic alternating voltage to the galvanometer, the reflected image of the straight wire filament is caused to sweep periodically across an opaque plate having a cross-shaped slit with one arm parallel to the direction of motion of the light beam and the other perpendicular thereto, the resulting light beam thus obtained being directed upon the moving film of the camera to produce a time-base line. The time-base line so produced comprises a zero reference line parallel to the direction of motion of the moving film and time interval marks transverse to the zero reference line.

The invention will be further described by reference to the accompanying drawings, in which:

Fig. 1 is a diagrammatic showing of one embodiment of this invention,

Fig. 2 represents one element of the embodiment of Fig. 1,

Fig. 3 shows the type of indication obtained with the embodiment of Fig. 1 when a photographic record is being made of a transitory phenomenon, Fig. 4 shows one element of another embodiment of the invention, Fig. 5 is a graph employed in the design of the embodiment of Fig. 4, and Fig. 6 shows the type of photographic record obtained with the embodiment of Fig. 4.

Referring now to Fig. 1, light from straight wire filament 5 of incandescent lamp 6 is focussed by lens 7 upon movable mirror 8 of galvanometer 9. Galvanometer 9 is a conventional galvanometer having a movable mirror of very small mass, and is positioned so that application of an alternating voltage to the galvanometer causes mirror 8 to rotate about an axis parallel to the axis of rotation of drum 11 of camera 12 over which film 13 passes as it is moved past aperture 14.

In the embodiment represented in Fig. 1 the alternating voltage applied to galvanometer 9 is a sine wave voltage having a frequency of 1000 C. P. S. This voltage is generated by a suitable sine wave generator 30, as is well known in the art. The line light image reflected from mirror 8 sweeps back and forth across masking means 15, see Fig. 2, in response to the sinusoidal voltage applied to galvanometer 9.

Masking means 15 which is shown in greater detail in Fig. 2, is provided with two slits one of which is a narrow slit 16 parallel to the direction of motion of light image 18 as the image is swept back and forth the other being a narrow slit 17 transverse to said direction. It will be seen that while image 18 is shining on slit 16 but is on one side or the other of slit 17 a point light beam will pass beyond masking means 15, but during the instant image 18 is shining on slit 17 a line light beam will pass beyond the masking means 15.

Because of the periodic nature of the sine wave voltage applied to galvanometer 9, equal periods of time elapse between every instant that light image 18 sweeps across slit 17 during its travel in a given direction. That is to say, equal intervals of time always elapse between every second instant when a line light beam is passed through masking means 15. In addition, if mirror 8 at its zero position in the galvanometer reflects line image 18 directly at slit 17, it will also be true that every instant when a line light beam passes beyond masking means 15 will mark off an equal time interval, since with this adjustment image 18 will cross slit 17 for zero values of the sine wave voltage applied to the galvanometer, which values are all separated by 180° phase differences.

The light beam which is passed through masking means 15 is reflected by mirror 19 into aperture 14 of camera 12, and there strikes moving film 13. In the embodiment of Fig. 1, for purposes of example, the transitory phenomenon which is to be recorded is shown as motion of the electron beam spot on screen 21 of cathode ray tube 22 in a direction transverse to the direction of motion of film 13. Camera 12 is so positioned that light from the fluorescent screen 21 of cathode ray tube 22 reaches the camera at approximately the same angle as the light beam from mirror 19.

In Fig. 3 there is illustrated a typical photographic record 23 of the path or trace of such motion of an electron beam spot, and included thereon is time base line 24 shown positioned in close proximity to the spot trace. Time interval marks 25 and 26 are produced by the line light beam striking film 13 every time line image 18 passes across slit 17. The time intervals indicated by adjacent marks 25 are equal to one millisecond, since the alternating voltage applied to galvanometer 9 has a frequency of 1000 C. P. S. The time intervals indicated by adjacent marks 26 are also equal to one millisecond. As explained above, if the position of line image 18 on masking means 15 coincides with slit 17 when mirror 8 is in the zero deflection position, then the time intervals indicated by any two adjacent marks 25 and 26 will be equal to each other, and thus equal to ½ millisecond.

It will be seen that the equal time intervals measured by adjacent time interval marks 25 and 26 in the embodiment of Fig. 1 may be as short as one-half the period of the highest frequency deflecting voltage to which galvanometer 9 will respond. If this highest frequency is 5000 C. P. S., for example, adjacent marks 25 and 26 will measure off intervals of one ten thousandth of a second. Moreover, the time interval marks provided by this invention possess such sharp definition and clarity that an even higher degree of accuracy may be easily obtained by estimating elapsed time to still another place.

By employing a masking means 15 of the structure shown in Fig. 4, the time interval represented by two adjacent time interval marks on the time base line may be reduced still further. In this embodiment, slits 28 and 29 are disposed as shown on either side of slit 17 and parallel thereto. If line image 18 coincides in position with slit 17 when mirror 8 is in the zero deflection position, and if mirror 8 is displaced sinusoidally from its zero position to maximum deflection points at the ends of slit 16, then four additional time interval marks are produced which divide the intervals between adjacent marks 26 and 25 into five equal subdivisions.

This will be understood by reference to the graph in Fig. 5 which shows the displacement of line image 18 from its zero position during one cycle of the sine wave voltage applied to galvanometer 9. The period between the zero phase points of the sine wave voltage being one millisecond, it is apparent that slits 28 and 29 may be so positioned that the coincidence of line image 18 with these slits divides the period into ten equal time intervals. The necessary positions of slits 17, 28 and 29 may readily be determined from Fig. 5.

Since the linear velocity of line image 18 decreases with increased displacement of line image 18, the width of slits 28 and 29 may be reduced if desired and the time interval marks produced on film 13 when the light beam passes through those slits will have the same width as time interval marks 25 and 26. If the length of slits 28 and 29 is made a fraction of the length of slit 17, the time interval marks indicating one-tenth millisecond will be shorter than those indicating one-half and one millisecond.

Fig. 6 represents a typical photographic record produced when the embodiment of Fig. 4 is employed. The distance between time interval marks 25 and 26 represents one-half millisecond, while the shorter marks 27 measure off one-tenth millisecond.

If the width of that part of moving film 13 which is occupied by the photographic record 23 of the transitory phenomenon being observed is only a small fraction of the total width of the film, then film 13 may be employed in several successive exposures of the same length of film. When this is done, since the light beam which produces time base line 24 enters camera 12 from the outside through aperture 14 and concurrently with the light energy from screen 21, each successive photographic record will have positioned in close proximity thereto its own distinct and self-contained time base.

As already explained, it is the line light beam passing through slit 17 of masking means 15 which produces time interval marks 25 and 26. The point light beam which is allowed to pass through slit 16 of masking means 15 when line image 18 impinges thereon moves continuously back and forth in a direction parallel to the direction of motion of moving film 13, so it traces out a line transverse to time interval marks 25 and 26, and parallel to the length of film 13. This line may be employed as a reference line for measuring the instantaneous amplitude of displacement in the phenomenon being observed and recorded. Moreover, the accuracy of this reference line will not be impaired by reason of lateral shifting of moving film 13 within camera 12, since the light beams from masking means 15 and screen 21 enter aperture 14 with a constant lateral relationship.

It is to be understood that the various embodiments shown and described are exemplary only and that the invention is not limited thereto as many changes in the particular construction may be made without departing from the spirit of the invention and covered by the scope of the appended claims.

The invention described herein may be manufactured and used by or for the Government of the United States of America for governmental purposes without the payment of any royalties thereon or therefor.

What is claimed is:

1. A system for providing a time base on a moving film photographic record of transitory phenomena, comprising a line light source, a galvanometer including reflecting means on a movable element of said galvanometer and disposed so that the line image from said light source is directed upon it, means for generating a periodic alternating voltage, means for applying said periodic voltage to said galvanometer, opaque masking means disposed so that the reflected light image will be swept across it and provided with a narrow slit therein transverse to the direction of motion of the light image in its sweep, and camera means positioned for photographically recording both the light beam passing through said masking means and the observed transitory phenomenon.

2. A time base generator for a moving photographic recording element of transitory phenomena, comprising a line light source, a galvanometer including reflecting means attached to a movable element of the galvanometer means and disposed so that the line image from said light source is directed upon it, means for generating a periodic alternating voltage, means for applying said periodic voltage to said galvanometer, opaque masking means disposed so that the reflected light image will be swept across it and having a narrow slit therein parallel to the direction of motion of the light image in its sweep and a narrow slit transverse to said direction, and means positioned for photographically recording on a common recording element both the light beam passing through said masking means and the observed transitory phenomenon.

3. A time base generator for a moving film photographic record of transitory phenomena, comprising a line light source, a galvanometer including reflecting means attached to a movable element of said galvanometer, means operative to focus the line light image upon said reflecting means, means for generating a periodic alternating voltage, means for applying said periodic voltage to the galvanometer, opaque masking means disposed so that the reflected light image will be swept across it and having a narrow slit therein parallel to the direction of motion of the light image in its sweep and a narrow slit transverse to said direction, and reflecting means operative to direct onto the moving film the light which passes through said slits.

4. A time base generator for a moving photographic recording element of transitory phenomena, comprising a line light source, a galvanometer including reflecting means on a movable element of said galvanometer and disposed so that the line image from said light source will be directed upon it, means for generating a periodic alternating voltage, means for applying said periodic voltage to said galvanometer, opaque masking means disposed so that the reflected light image will be swept across it and having a plurality of narrow slits therein transverse to the direction of motion of the light image in its sweep, and means positioned for photographically recording on a common recording element both the light beam passing through said masking means and the observed transitory phenomenon.

5. A system for providing a time base on a moving film photographic recording device, comprising a narrow beam light source, an oscillating reflecting means positioned in the beam of said light source, masking means having a cross shaped aperture formed therein and positioned within the sweep path of the light beam reflected by said reflecitng means, one leg of said aperture being oriented transversely to the sweep path of said deflected light beam and the other leg being oriented parallel thereto, and means focusing the light beam passing through said masking means onto said moving film.

ERWIN W. KAMMER.

REFERENCES CITED

The following references are of record in the file of this patent:

UNITED STATES PATENTS

| Number | Name | Date |
| --- | --- | --- |
| 1,300,191 | Pogue | Apr. 8, 1919 |
| 1,913,200 | Hathaway | June 6, 1933 |
| 2,230,502 | Pearson | Feb. 4, 1941 |
| 2,348,401 | Manzanera | May 9, 1944 |
| 2,404,137 | Maurer | July 16, 1946 |